US012774050B2

(12) United States Patent
Kuo et al.

(10) Patent No.: US 12,774,050 B2
(45) Date of Patent: Oct. 27, 2026

(54) INTELLIGENT SERIAL ELASTIC ASSISTIVE APPARATUS FOR LEGGED ROBOT LINKAGE DRIVING DEVICE

(71) Applicant: NATIONAL TAIWAN UNIVERSITY, Taipei City (TW)

(72) Inventors: Chung-Hsien Kuo, New Taipei City (TW); Yu-Cheng Kuo, Taipei City (TW)

(73) Assignee: NATIONAL TAIWAN UNIVERSITY, Taipei City (TW)

( * ) Notice: Subject to any disclaimer, the term of this patent is extended or adjusted under 35 U.S.C. 154(b) by 0 days.

(21) Appl. No.: 19/262,116

(22) Filed: Jul. 8, 2025

(65) Prior Publication Data

US 2026/0028072 A1 Jan. 29, 2026

(30) Foreign Application Priority Data

Jul. 29, 2024 (TW) ................................ 113128028

(51) Int. Cl.
*B62D 57/032* (2006.01)

(52) U.S. Cl.
CPC .................................. *B62D 57/032* (2013.01)

(58) Field of Classification Search
CPC .................................................... B62D 57/032
See application file for complete search history.

(56) References Cited

U.S. PATENT DOCUMENTS 10,189,519 B2 1/2019 Hurst et al.
2002/0062178 A1* 5/2002 Takahashi ............ B62D 57/032 700/245

(Continued)

FOREIGN PATENT DOCUMENTS

CN 113479273 A 10/2021
CN 113635345 A 11/2021
CN 216401576 U 4/2022

OTHER PUBLICATIONS

Zhu, "Design and control of BRAVER: a bipedal robot actuated via proprioceptive electric motors", Jul. 23, 2023, https://link.springer.com/article/10.1007/s10514-023-10117-5, Accessed:Aug. 7, 2026 (Year: 2023).*

(Continued)

*Primary Examiner* — Wade Miles
*Assistant Examiner* — Jaewook Jung
(74) *Attorney, Agent, or Firm* — Li & Cai Intellectual Property Office

(57) ABSTRACT

An intelligent serial elastic assistive apparatus for a legged robot linkage driving device includes a linkage driving device and an intelligent serial elastic assistive device. The linkage driving device includes a thigh linkage rod, a calf linkage rod, a driving linkage rod, a driving connection member, and a driving motor. The intelligent serial elastic assistive device includes an assistive elastic member, a linear actuation module, a distance sensing module, and a control module. The driving motor drives the driving connection member to rotate. Two ends of the driving motor are pivotally connected to the driving linkage rod and the assistive elastic member, respectively. The control module adjusts distances between the two ends of the assistive elastic member through the linear actuation module according to changes in distance between the two ends of the assistive elastic member sensed through the distance sensing module.

8 Claims, 7 Drawing Sheets

(56) References Cited

U.S. PATENT DOCUMENTS

| | | | | |
|---|---|---|---|---|
| 2020/0361101 | A1* | 11/2020 | Zhang | B25J 19/0025 |
| 2022/0324526 | A1* | 10/2022 | Wang | G01L 1/02 |

OTHER PUBLICATIONS

Zhou, "An Efficient Gait-generating Method for Electrical Quadruped Robot Based on Humanoid Power Planning Approach", Sep. 14, 2020, https://link.springer.com/article/10.1007/s42235-021-00089-6, Accessed: Aug. 7, 2026 (Year: 2020).*

* cited by examiner

INTELLIGENT SERIAL ELASTIC ASSISTIVE APPARATUS FOR LEGGED ROBOT LINKAGE DRIVING DEVICE

CROSS-REFERENCE TO RELATED PATENT APPLICATION

This application claims the benefit of priority to Taiwan Patent Application No. 113128028, filed on Jul. 29, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an assistive apparatus of a legged robot, and more particularly to an intelligent serial elastic assistive apparatus for a legged robot linkage driving device.

BACKGROUND OF THE DISCLOSURE

With the development of science and technology, robots have become an important development trend, especially legged robots such as robot dogs. Generally, each leg of a legged robot has at least two drive motors respectively driving movements of the thigh and the calf. Since the calf needs to support the weight of the entire legged robot, the drive motor of the calf has the largest moment of force and the highest output power, such that the drive motor of the calf has the greatest impact on the operating time (e.g., battery life) of the legged robot. Therefore, lowering the output power of the drive motor of the calf without affecting movement functions of the legged robots is an issue yet to be addressed in the relevant industry.

SUMMARY OF THE DISCLOSURE

In response to the above-referenced technical inadequacies, the present disclosure provides an intelligent serial elastic assistive apparatus for a legged robot linkage driving device.

In order to solve the above-mentioned problems, one of the technical aspects adopted by the present disclosure is to provide an intelligent serial elastic assistive apparatus for a legged robot linkage driving device. The intelligent serial elastic assistive apparatus includes a linkage driving device and an intelligent serial elastic assistive device. The linkage driving device includes a thigh linkage rod, a calf linkage rod, a driving linkage rod, a driving connection member, and a driving motor. The thigh linkage rod has a first end and a second end opposite to each other, the calf linkage rod has a first end and a second end opposite to each other, and the second end of the thigh linkage rod is pivotally connected to the first end of the calf linkage rod. The driving motor is fixed to the first end of the thigh linkage rod, and the driving motor has a driving part that is rotatable. The driving connection member has a central part, and a first connection part and a second connection part located at opposite ends of the central part, and the central part of the driving connection member is connected to the driving part of the driving motor. The driving linkage rod has a first end and a second end opposite to each other, the first end of the driving linkage rod is pivotally connected to the first connection part of the driving connection member, the second end of the driving linkage rod is pivotally connected to the first end of the calf linkage rod, and the driving motor is configured to drive the driving connection member to rotate relative to the thigh linkage rod, so that the driving linkage rod drives the calf linkage rod to rotate relative to the thigh linkage rod. The intelligent serial elastic assistive device includes an assistive elastic member, a linear actuation module, a distance sensing module, and a control module. The assistive elastic member has a first end and a second end opposite to each other, the second connection part of the driving connection member is pivotally connected to the first end of the assistive elastic member, and the second end of the assistive elastic member is connected to a front end of the linear actuation module. The linear actuation module is configured to adjust a distance between the first end and the second end of the assistive elastic member, and the distance sensing module is configured to sense the distance between the first end and the second end of the assistive elastic member. The control module is electrically connected to the linear actuation module and the distance sensing module, and the control module is configured to determine a load change according to a change of the distance between the first end and the second end of the assistive elastic member sensed by the distance sensing module, so as to adjust an initial distance between the first end and the second end of the assistive elastic member through the linear actuation module to correspond to different load states. The control module is further configured to determine a change in applied force according to the change of the distance between the first end and the second end of the assistive elastic member sensed by the distance sensing module, so as to dynamically adjust the distance between the first end and the second end of the assistive elastic member through the linear actuation module to correspond to different force conditions.

In one of the possible or preferred embodiments, the first connection part of the driving connection member and the first end of the driving linkage rod are pivotally connected through a first connection pivot, and the second connection part of the driving connection member and the first end of the assistive elastic member are pivotally connected through a second connection pivot.

In one of the possible or preferred embodiments, the assistive elastic member is disposed along a length direction of the thigh linkage rod.

In one of the possible or preferred embodiments, the linear actuation module is located on one side of the thigh linkage rod.

In one of the possible or preferred embodiments, a movable part for linear movement is disposed on the front end of the linear actuation module, and the second end of the assistive elastic member is connected to the movable part of the linear actuation module. The linear actuation module drives the movable part to move linearly in a direction toward the first end of the assistive elastic member to compress the assistive elastic member. The linear actuation module drives the movable part to move linearly in a direction away from the first end of the assistive elastic member to stretch the assistive elastic member. In one of the possible or preferred embodiments, the distance sensing module is disposed on the front end of the linear actuation module.

In one of the possible or preferred embodiments, the intelligent serial elastic assistive device further includes a posture sensing module electrically connected to the control module, the posture sensing module is configured to sense a walking posture of a legged robot, and correspondingly outputs posture sensing data to the control module. The control module is configured to determine a change in the walking posture according to the posture sensing data of the posture sensing module, so as to further dynamically adjust the distance between the first end and the second end of the assistive elastic member through the linear actuation module to correspond to different walking posture states.

In one of the possible or preferred embodiments, the posture sensing module is located on one side of the thigh linkage rod.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
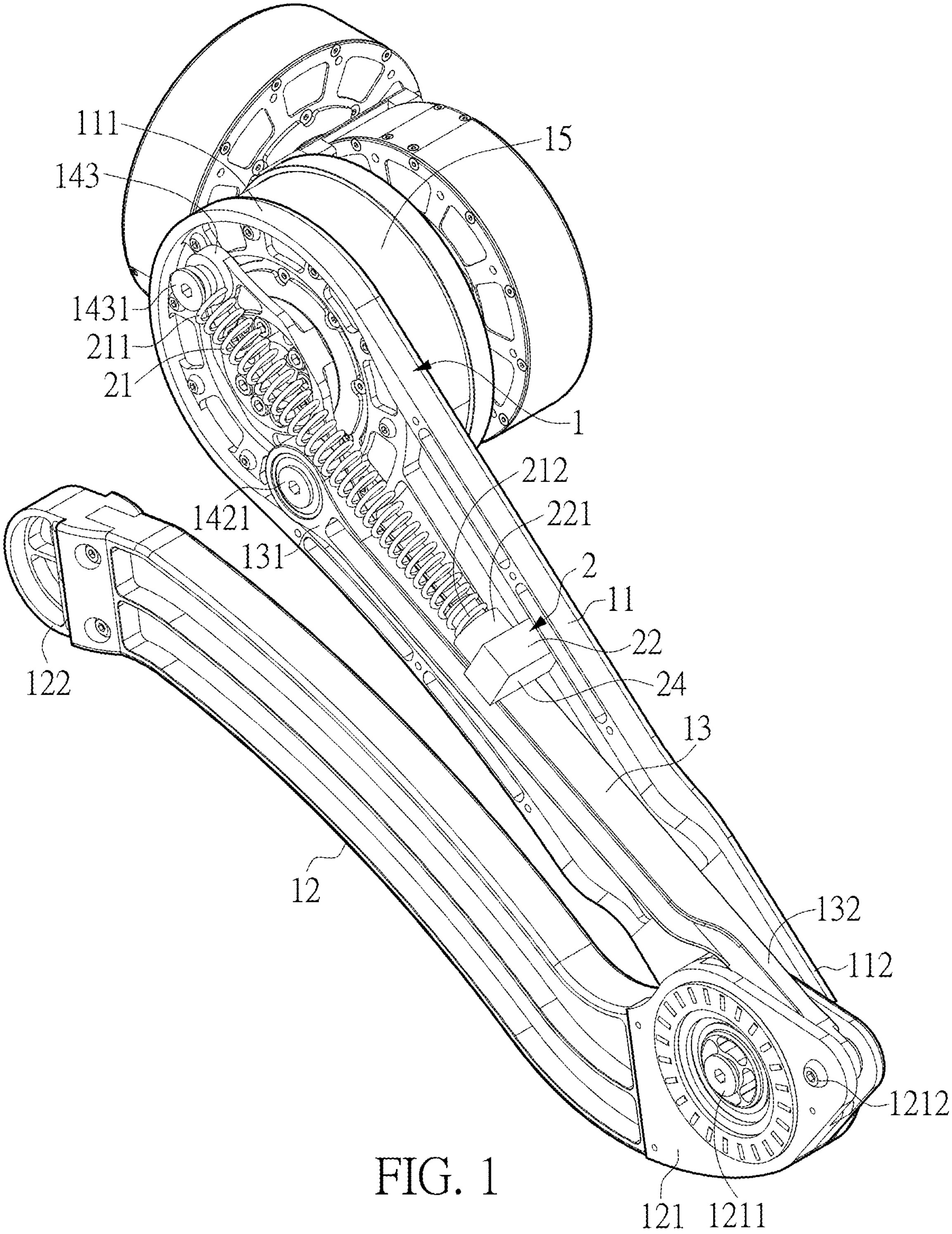
FIG. 1 is a perspective view of an intelligent serial elastic assistive apparatus for a legged robot linkage driving device according to one embodiment of the present disclosure.
Figure 2:
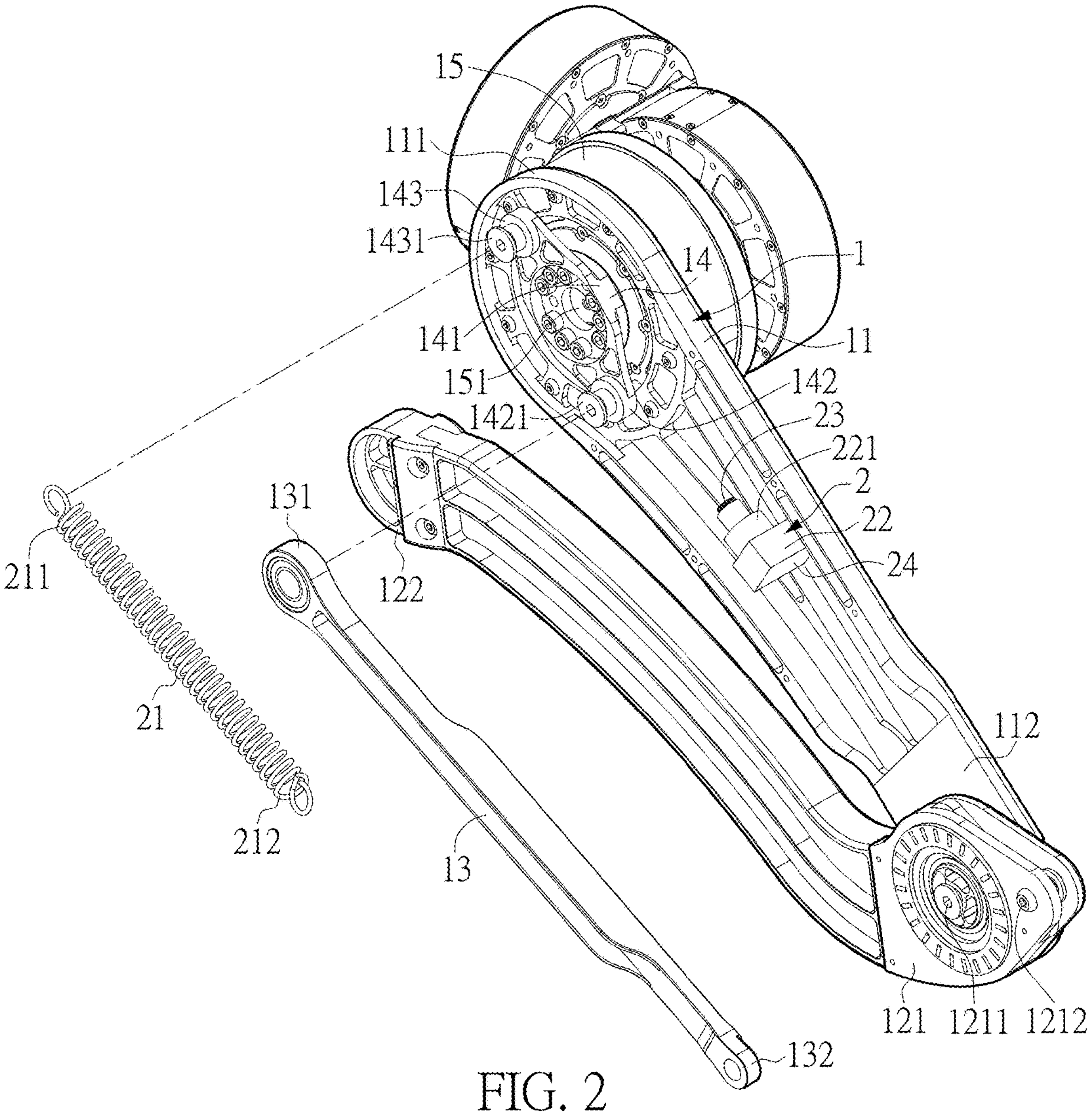
FIG. 2 is a partially exploded view of the intelligent serial elastic assistive apparatus according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 5, an intelligent serial elastic assistive apparatus for a legged robot linkage driving device is provided in one embodiment of the present disclosure, and is used on a legged robot having a body and multiple legs. The legged robot can realize functions such as walking, running, and jumping through a linkage driving device. The legged robot of the present embodiment may be a robot dog, which is a legged robot including a body and four legs. Naturally, the legged robot of the present embodiment may also be a legged robot including two or three legs, or even a legged robot including only one leg, and the present disclosure is not limited thereto.

This embodiment provides an intelligent serial elastic assistive apparatus for a legged robot linkage driving device, and the intelligent serial elastic assistive apparatus essentially includes a linkage driving device 1 and an intelligent serial elastic assistive device 2.

The linkage driving device 1 of the present embodiment includes a thigh linkage rod 11, a calf linkage rod 12, a driving linkage rod 13, a driving connection member 14, and a driving motor 15.

The thigh linkage rod 11 has a first end 111 and a second end 112 opposite to each other, the calf linkage rod 12 has a first end 121 and a second end 122 opposite to each other, the second end 112 of the thigh linkage rod 11 and the first end 121 of the calf linkage rod 12 are pivotally connected, and the thigh linkage rod 11 and the calf linkage rod 12 can be pivotally connected through a first pivot axis 1211. The driving motor 15 is located at the first end 111 of the thigh linkage rod 11, and the driving motor 15 has a driving part 151 that is rotatable. The driving connection member 14 has a central part 141 and a first connection part 142 and a second connection part 143 located at the two opposite ends of the central part 141, respectively. The central part 141 of the driving connection member 14 is connected to the driving part 151 of the driving motor 15, such that the driving motor 15 can drive the driving connection member 14 to rotate relative to the thigh linkage rod 11. The driving linkage rod 13 has a first end 131 and a second end 132 opposite to each other, the first end 131 of the driving linkage rod 13 is pivotally connected to the first connection part 142 of the driving connection member 14, and the driving linkage rod 13 and the driving connection member 14 can be pivotally connected through a first connection pivot axis 1421 of the first connection part 142. The second end 132 of the driving linkage rod 13 is pivotally connected to the first end 121 of the calf linkage rod 12, the driving linkage rod 13 and the calf linkage rod 12 can be pivotally connected through a second pivot axis 1212, and the second pivot axis 1212 and the first pivot axis 1211 are located at different locations on the first end 121 of the calf linkage rod 12. The driving motor 15 can drive the driving connection member 14 to rotate relative to the thigh linkage rod 11, such that the driving linkage rod 13 drives the calf linkage rod 12 to rotate relative to the thigh linkage rod 11.

Figure 3:
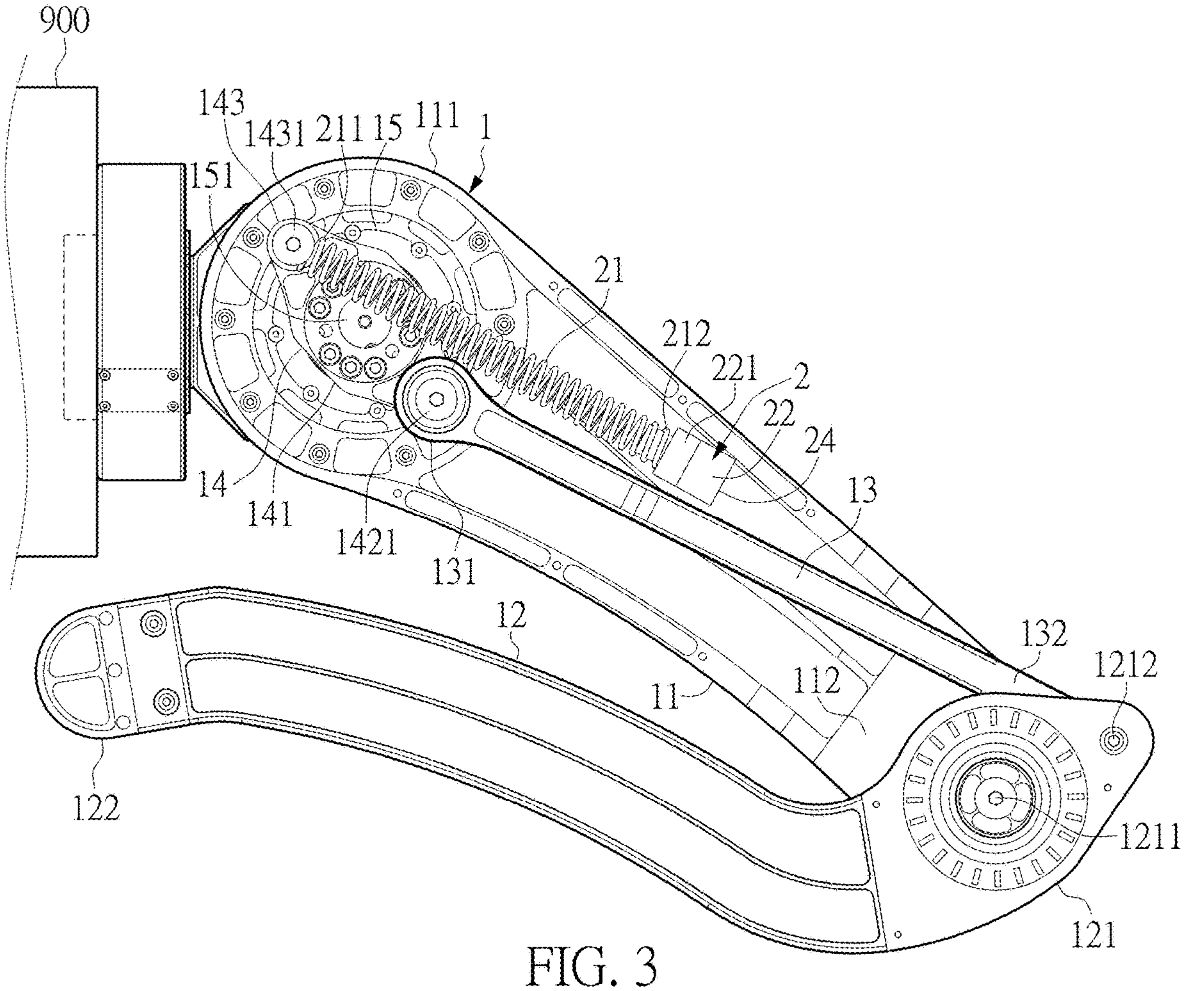
FIG. 3 is a schematic view of a legged robot in a kneeling posture according to one embodiment of the present disclosure.
Figure 4:
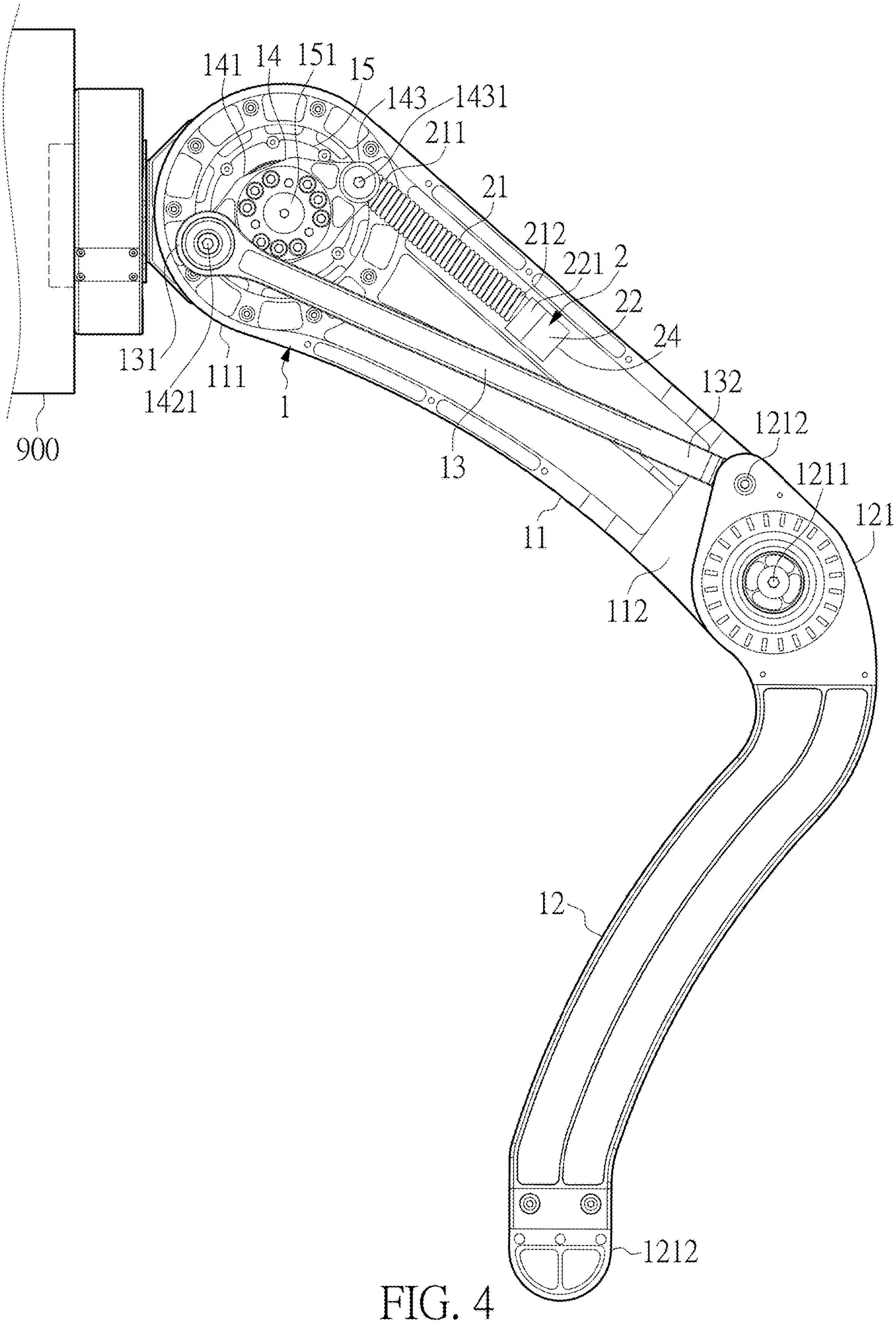
FIG. 4 is a schematic view of the legged robot in a standing posture according to one embodiment of the present disclosure.
Figure 5:
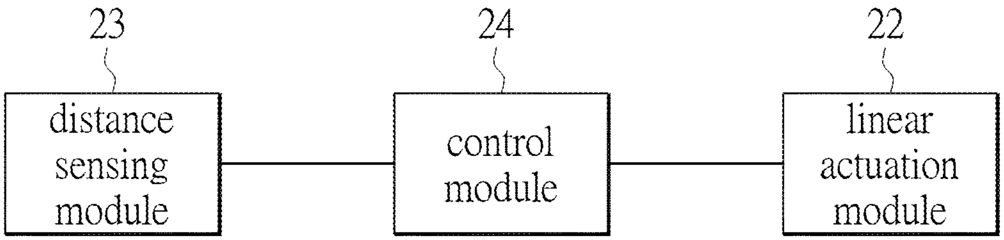
FIG. 5 is a block diagram of the intelligent serial elastic assistive apparatus according to one embodiment of the present disclosure.

For example, when the driving motor 15 drives the driving connection member 14 to rotate in a first rotation direction (e.g., clockwise), the first connection part 142 of the driving connection member 14 drives the driving linkage rod 13, thereby driving the calf linkage rod 12 to rotate counterclockwise relative to the thigh linkage rod 11, such that an angle between the thigh linkage rod 11 and the calf linkage rod 12 is gradually increased; accordingly, the legged robot is in a standing posture (as shown in FIG. 4). When the driving motor 15 drives the driving connection member 14 to rotate in a second rotation direction (e.g., counterclockwise), the first connection part 142 of the driving connection member 14 drives the driving linkage rod 13, thereby driving the calf linkage rod 12 to rotate clockwise relative to the thigh linkage rod 11, such that the angle between the thigh linkage rod 11 and the calf linkage rod 12 is gradually decreased; accordingly, the legged robot is in a crouching or kneeling posture (as shown in FIG. 3). A range of a movement angle between the thigh linkage rod 11 and the calf linkage rod 12 can be adjusted according to practical requirements and is not limited herein.

The intelligent serial elastic assistive device 2 of the present embodiment includes an assistive elastic member 21, a linear actuation module 22, a distance sensing module 23, and a control module 24.

Accordingly, the assistive elastic member 21 has a first end 211 and a second end 212 opposite to each other, and the second connection part 143 of the driving connection member 14 is pivotally connected to the first end 211 of the assistive elastic member 21. The second connection part 143 of the driving connection member 14 and the first end 211 of the assistive elastic member 21 can be pivotally connected through a second connection pivot axis 1431 of the second connection part 143. The second end 212 of the assistive elastic member 21 is connected to a front end of the linear actuation module 22. The assistive elastic member 21 may be a compression spring, a tension spring, other types of springs, or various types of elastic buffers. Furthermore, the assistive elastic member 21 may be disposed along a length direction of the thigh linkage rod 11.

The linear actuator module 22 can be or include a small linear actuator. The linear actuator can be a rack and/or a screw rod that converts the rotational motion of a stepping motor into a linear motion, or the linear actuator can perform a linear movement through a linear motor. Furthermore, the linear actuator module 22 can adjust a distance between the first end 211 and the second end 212 of the assistive elastic member 21. Specifically, the front end of the linear actuation module 22 has a movable part 221 that can move linearly, and the second end 212 of the assistive elastic member 21 is connected to the movable part 221. The linear actuation module 22 can drive the movable part 221 to move linearly in a direction toward the first end 211 of the assistive elastic member 21 to compress the assistive elastic member 21. The linear actuation module 22 can also drive the movable part 221 to move linearly in a direction away from the first end 211 of the assistive elastic member 21 to stretch the assistive elastic member 21. Therefore, the linear actuation module 22 can adjust the distance between the first end 211 and the second end 212 of the assistive elastic member 21.

The distance sensing module 23 can be located at the second end 212 of the assistive elastic member 21. That is, the distance sensing module 23 can be located between the second end 211 of the assistive elastic member 21 and the front end of the linear actuation module 22, or located at the first end 211 of the assistive elastic member 21, i.e., between the first end 211 of the assistive elastic member 21 and the second connection part 143 of the driving connection member 14. Furthermore, the distance sensing module 23 can sense the distance between the first end 211 and the second end 212 of the assistive elastic member 21. In other words, the distance sensing module 23 can sense a length of the assistive elastic member 21, or in other words, the distance sensing module 23 can sense a distance from the front end of the linear actuation module 22 to the second connection part 143 of the driving connection member 14, so as to sense the distance between the first end 211 and the second end 212 of the assistive elastic member 21. The distance sensing module 23 can be an infrared distance measuring sensor, an ultrasonic distance measuring sensor, a laser distance measuring sensor, a contact movement sensor, or other types of contact or non-contact distance sensors. The distance sensing module 23 can be disposed at the movable part 221 on the front end of the linear actuation module 22, and the distance sensing module 23 is preferably a non-contact distance sensor, such as an infrared distance measuring sensor that uses an infrared radar to measure the distance between the first end 211 and the second end 212 of the assistive elastic member 21.

The control module 24 is electrically connected to the linear actuation module 22 and the distance sensing module 23, respectively. The control module 24 may be an independently operated microcontroller (MCU) or other controllers, and is integrated with the linear actuation module 22 into a module and disposed at one side of the thigh linkage rod 11. In addition, the control module 24 can also be integrated with a central processing unit of the legged robot and be disposed on a body 900 of the legged robot.

In other words, the control module 24 can determine a load change according to a change of the distance between the first end 211 and the second end 212 of the assistive elastic member 21 sensed by the distance sensing module 23, so as to adjust an initial distance between the first end 211 and the second end 212 of the assistive elastic member 21 through the linear actuation module 22 to correspond to different load states. The load of the present disclosure refers to a body weight and/or a cargo weight of the legged robot.

For example, when the legged robot is in a standing posture and the load becomes larger, the driving connection member 14 rotates counterclockwise by an increased angle, thereby increasing the distance between the first end 211 and the second end 212 of the assistive elastic member 21 sensed by the distance sensing module 23. When the legged robot is in the standing posture and the load becomes smaller, the driving connection member 14 rotates counterclockwise by a decreased angle, thereby decreasing the distance between the first end 211 and the second end 212 of the assistive elastic member 21 sensed by the distance sensing module 23. Therefore, the control module 24 can determine a load change according to the change in the distance between the first end 211 and the second end 212 of the assistive elastic member 21 sensed by the distance sensing module 23. Furthermore, the control module 24 adjusts the initial distance between the first end 211 and the second end 212 of the assistive elastic member 21 through the linear actuation module 22 to correspond to different load states. Therefore, when the load becomes smaller, the control module 24 adjusts the initial distance between the first end 211 and the second end 212 of the assistive elastic member 21 through the linear actuation module 22, such that the initial distance is configured to be longer. When the load becomes larger, the control module 24 adjusts the initial distance between the first end 211 and the second end 212 of the assistive elastic member 21 through the linear actuation module 22, such that the initial distance is configured to be shorter. Accordingly, different assistive output forces are provided corresponding to different load states, thereby significantly reducing the output power of the driving motor 15 under the same load.

In addition, the control module 24 can determine a force-bearing change according to the change of the distance between the first end 211 and the second end 212 of the assistive elastic member 21 sensed by the distance sensing module 23, so as to dynamically adjust the distance between the first end 211 and the second end 212 of the assistive elastic member 21 through the linear actuation module 22 to correspond to different force conditions.

That is, a contact force exerted by the legged robot to the ground when walking causes the distance between the first end 211 and the second end 212 of the assistive elastic member 21 to change. Therefore, the control module 24 can determine a load change according to changes in the distance between the first end 211 and the second end 212 of the assistive elastic member 21 sensed by the distance sensing module 23, and then dynamically adjust the distance between the first end 211 and the second end 212 of the assistive elastic member 21 through the linear actuation module 22 to correspond to different force conditions, so as to dynamically adjust in real-time an assistive output force provided by the assistive elastic member 21 of the intelligent serial elastic assistive device 2 to the driving motor 15 of the linkage driving device 1 for achieving power consumption optimization.

For example, when the contact force exerted by a walking legged robot to the ground is increased, the driving connection member 14 rotates counterclockwise by an increased angle, thereby increasing the distance between the first end 211 and the second end 212 of the assistive elastic member 21. Based on the distance sensing module 23 sensing a longer distance between the first end 211 and the second end 212 of the assistive elastic member 21, the control module 24 determines that soles and joints of the legged robot withstand greater force when the legged robot is walking, and dynamically adjusts the distance between the first end 211 and the second end 212 of the assistive elastic member 21 in real-time, such that the distance between the first end 211 and the second end 212 of the assistive elastic member 21 becomes shorter. On the other hand, when the contact force exerted by the walking legged robot to the ground is decreased, the driving connection member 14 rotates counterclockwise by a decreased angle, thereby decreasing the distance between the first end 211 and the second end 212 of the assistive elastic member 21. Based on the distance sensing module 23 sensing a shorter distance between the first end 211 and the second end 212 of the assistive elastic member 21, the control module 24 determines that the soles and the joints of the legged robot withstand smaller force when the legged robot is walking, and dynamically adjusts the distance between the first end 211 and the second end 212 of the assistive elastic member 21 in real-time, such that the distance between the first end 211 and the second end 212 of the assistive elastic member 21 becomes longer. Accordingly, the assistive output force provided by the assistive elastic member 21 of the intelligent serial elastic assistive device 2 to the driving motor 15 of the linkage driving device 1 to achieve power consumption optimization is dynamically adjusted. In addition, since the soles of the legged robot do not require a ground reaction force sensing device, the overall cost is reduced, and issues regarding the circuit configuration and feedbacks between the entire legged robot and the ground reaction force sensing device are prevented.

Figure 6:
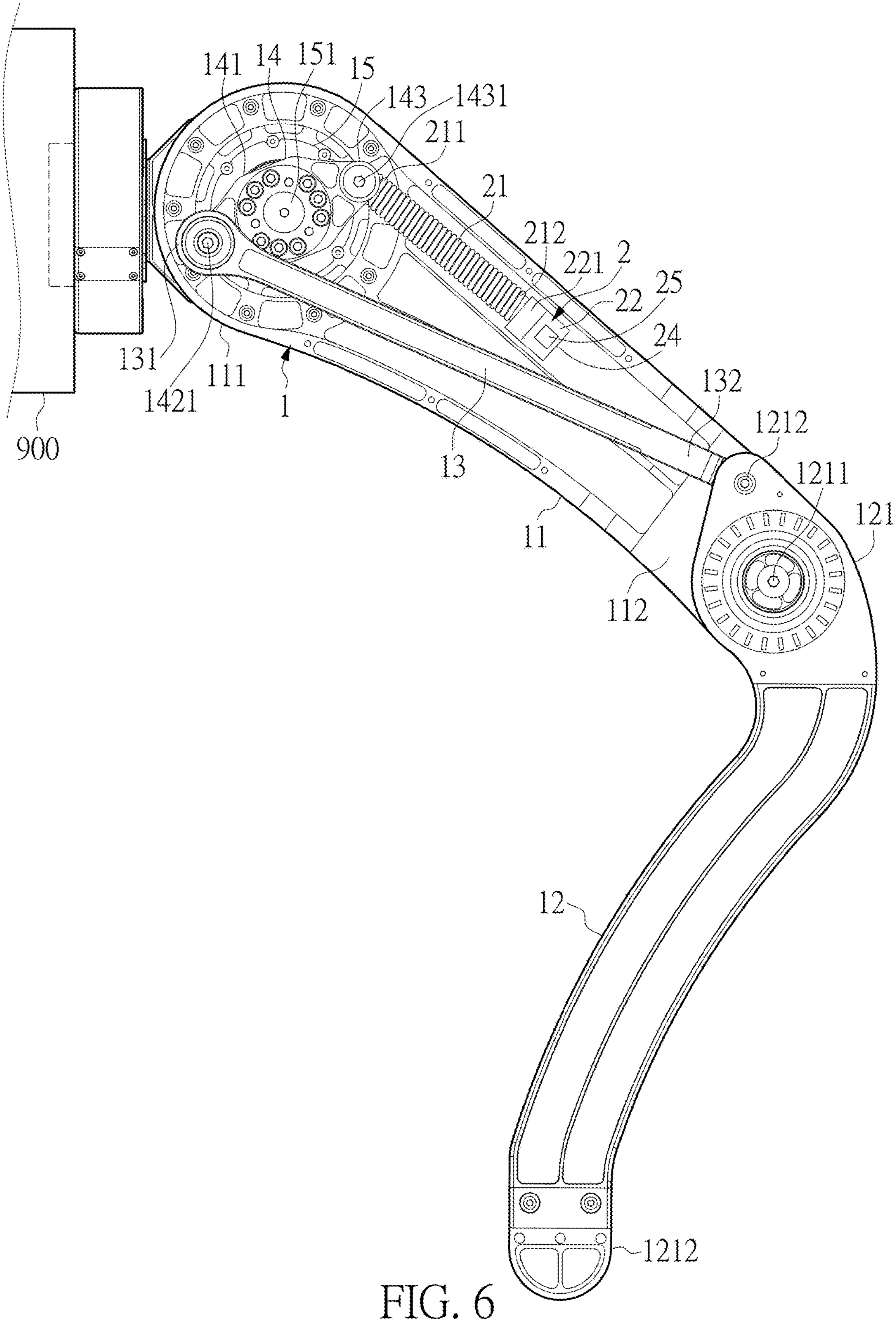
FIG. 6 is another schematic view of the legged robot in the standing posture according to one embodiment of the present disclosure.
Figure 7:
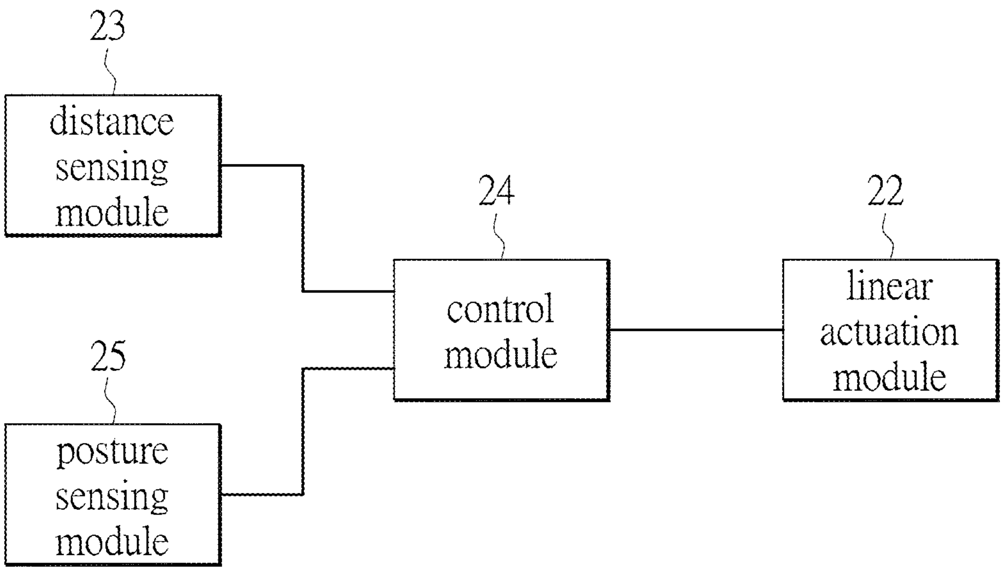
FIG. 7 is another block diagram of the intelligent serial elastic assistive apparatus according to one embodiment of the present disclosure.

In one embodiment, as shown in FIG. 6 and FIG. 7, the intelligent serial elastic assistive device 2 further includes a posture sensing module 25 electrically connected to the control module 24. The posture sensing module 25 can sense the walking posture of the legged robot and correspondingly output posture sensing data to the control module 24. The posture sensing module 25 can be integrated with the linear actuation module 22 or the control module 24 into a single module to be disposed on one side of the thigh linkage rod 11, or the posture sensing module 25 is separately disposed on one side of the thigh linkage rod 11. In addition, the posture sensing module 25 can be separately disposed on the body 900 of the legged robot. The posture sensing module 25 may be a gyroscope or a three-axis gyroscope, and the posture sensing data may be angular velocity data of the legged robot when walking. The posture sensing module 25 may be an accelerometer, and may be a three-axis accelerometer. The posture sensing data may be acceleration data of the legged robot when walking. In addition, the posture sensing module 25 may include a gyroscope and an accelerometer, and the control module 24 may determine changes in walking posture according to the posture sensing data continuously output by the posture sensing module 25, thereby further dynamically adjusting the distance between the first end 211 and the second end 212 of the assistive elastic member 21 through the linear actuation module 22 to correspond to different posture states.

For example, when the walking posture of the legged robot becomes impaired, a G value corresponding to the amplitude of one axis (such as a Z-axis) in the posture sensing data that is continuously output by the posture sensing module 25 will be greater than 1G for N seconds in a row, in which N can be greater than or equal to three. Accordingly, the control module 24 can cooperate with the posture sensing data that is continuously output by the posture sensing module 25 to determine that the walking posture of the legged robot is impaired, and the control module 24 then dynamically adjusts the distance between the first end 211 and the second end 212 of the assistive elastic member 21 through the linear actuation module 22, such that the distance between the first end 211 and the second end 212 of the assistive elastic member 21 is shortened. That is, after adjustment, the distance between the first end 211 and the second end 212 of the assistive elastic member 21 is less than a current distance, thereby further dynamically adjusting the assistive output force provided by the assistive elastic member 21 of the intelligent serial elastic assistive device 2 to the driving motor 15 of the linkage driving device 1 for achieving power consumption optimization.

In summary, the intelligent serial elastic assistive device for a legged robot linkage driving device provided by the present disclosure includes a linkage driving device and an intelligent serial elastic assistive device. The linkage driving device includes a thigh linkage rod, a calf linkage rod, a driving linkage rod, a driving connection member, and a driving motor. The intelligent serial elastic assistive device includes an assistive elastic member, a linear actuation module, a distance sensing module, and a control module. The driving motor can drive the driving connection member to rotate. One end of the driving connection member is pivotally connected to the driving linkage rod, and another end of the driving connection member is pivotally connected to the assistive elastic member. The linear actuation module can adjust a distance between the two ends of the assistive elastic member, and the distance sensing module can sense the distance between the two ends of the assistive elastic member. The control module, according to changes of the distance between the two ends of the assistive elastic member sensed by the distance sensing module, adjusts the distance between the two ends of the assistive elastic member through the linear actuation module, so as to dynamically adjust an assistive output force provided by the assistive elastic member of the intelligent serial elastic assistive device to the driving motor of the linkage driving device. Therefore, the intelligent serial elastic assistive device for the legged robot linkage driving device of the present disclosure can greatly reduce the output power of the driving motor under the same load, and can configure corresponding initial assistive forces when the legged robot is under different loads. Furthermore, the intelligent serial elastic assistive device for the legged robot linkage driving device of the present disclosure can further provide instant feedback on a force-bearing change in the joints when the legged robot is in contact with the ground while walking, such that the sole of the legged robot does not require a ground reaction force sensing device, thereby reducing the overall cost and preventing issues regarding the circuit configuration and feedbacks between the entire legged robot and the ground reaction force sensing device.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An intelligent serial elastic assistive apparatus for a legged robot linkage driving device, the intelligent serial elastic assistive apparatus comprising:

a linkage driving device including a thigh linkage rod, a calf linkage rod, a driving linkage rod, a driving connection member, and a driving motor, wherein the thigh linkage rod has a first end and a second end opposite to each other, the calf linkage rod has a first end and a second end opposite to each other, and the second end of the thigh linkage rod is pivotally connected to the first end of the calf linkage rod; wherein the driving motor is fixed to the first end of the thigh linkage rod, and the driving motor has a driving part that is rotatable; wherein the driving connection member has a central part, and a first connection part and a second connection part located at opposite ends of the central part, and the central part of the driving connection member is connected to the driving part of the driving motor; and wherein the driving linkage rod has a first end and a second end opposite to each other, the first end of the driving linkage rod is pivotally connected to the first connection part of the driving connection member, the second end of the driving linkage rod is pivotally connected to the first end of the calf linkage rod, and the driving motor is configured to drive the driving connection member to rotate relative to the thigh linkage rod, so that the driving linkage rod drives the calf linkage rod to rotate relative to the thigh linkage rod; and an intelligent serial elastic assistive device including an assistive elastic member, a linear actuation module, a distance sensing module, and a control module, wherein the assistive elastic member has a first end and a second end opposite to each other, the second connection part of the driving connection member is pivotally connected to the first end of the assistive elastic member, and the second end of the assistive elastic member is connected to a front end of the linear actuation module; wherein the linear actuation module is configured to adjust a distance between the first end and the second end of the assistive elastic member, and the distance sensing module is configured to sense the distance between the first end and the second end of the assistive elastic member; wherein the control module is electrically connected to the linear actuation module and the distance sensing module, and the control module is configured to determine a load change according to a change of the distance between the first end and the second end of the assistive elastic member sensed by the distance sensing module, so as to adjust an initial distance between the first end and the second end of the assistive elastic member through the linear actuation module to correspond to different load states; and wherein the control module is further configured to determine a force-bearing change according to the change of the distance between the first end and the second end of the assistive elastic member sensed by the distance sensing module, so as to dynamically adjust the distance between the first end and the second end of the assistive elastic member through the linear actuation module to correspond to different force conditions.

2. The intelligent serial elastic assistive apparatus according to claim 1, wherein the first connection part of the driving connection member and the first end of the driving linkage rod are pivotally connected through a first connection pivot, and the second connection part of the driving connection member and the first end of the assistive elastic member are pivotally connected through a second connection pivot.

3. The intelligent serial elastic assistive apparatus according to claim 1, wherein the assistive elastic member is disposed along a length direction of the thigh linkage rod.

4. The intelligent serial elastic assistive apparatus according to claim 1, wherein the linear actuation module is located on one side of the thigh linkage rod.

5. The intelligent serial elastic assistive apparatus according to claim 1, wherein a movable part for linear movement is disposed on the front end of the linear actuation module, and the second end of the assistive elastic member is connected to the movable part of the linear actuation module; wherein the linear actuation module drives the movable part to move linearly in a direction toward the first end of the assistive elastic member to compress the assistive elastic member; and wherein the linear actuation module drives the movable part to move linearly in a direction away from the first end of the assistive elastic member to stretch the assistive elastic member.

6. The intelligent serial elastic assistive apparatus according to claim 1, wherein the distance sensing module is disposed on the front end of the linear actuation module.

7. The intelligent serial elastic assistive apparatus according to claim 1, wherein the intelligent serial elastic assistive device further includes a posture sensing module electrically connected to the control module, the posture sensing module is configured to sense a walking posture of a legged robot, and correspondingly outputs posture sensing data to the control module; and wherein the control module is configured to determine a change in the walking posture according to the posture sensing data of the posture sensing module, so as to further dynamically adjust the distance between the first end and the second end of the assistive elastic member through the linear actuation module to correspond to different walking posture states.

8. The intelligent serial elastic assistive apparatus according to claim 7, wherein the posture sensing module is located on one side of the thigh linkage rod.

* * * * *